United States Patent
Tani et al.

(10) Patent No.: US 7,463,949 B2
(45) Date of Patent: Dec. 9, 2008

(54) POWER CONTROL APPARATUS AND METHOD FOR ELECTRICAL SYSTEM OF VEHICLE

(75) Inventors: Keisuke Tani, Nagoya (JP); Kazuyoshi Obayashi, Chita-gun (JP); Takashi Senda, Niwa-gun (JP); Hiroshi Tamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 11/253,669

(22) Filed: Oct. 20, 2005

(65) Prior Publication Data

US 2006/0122737 A1 Jun. 8, 2006

(30) Foreign Application Priority Data

Dec. 8, 2004 (JP) ............................. 2004-356030

(51) Int. Cl.
G06F 19/00 (2006.01)
(52) U.S. Cl. .................... 700/286; 307/10.6
(58) Field of Classification Search ................ 700/286, 700/295, 292; 307/10.6; 705/410; 701/103
See application file for complete search history.

(56) References Cited

U.S. PATENT DOCUMENTS 6,679,344 B1 * 1/2004 Bertram et al. ............ 180/65.3
2004/0164616 A1 8/2004 Obayashi et al.
2006/0061307 A1 * 3/2006 Donnelly ................... 318/108
2007/0144398 A1 * 6/2007 Kumar et al. ................ 105/50
2007/0198167 A1 * 8/2007 Dery .......................... 701/113

OTHER PUBLICATIONS

Chinese Examination Report dated Jun. 22, 2007 in corresponding Chinese patent application No. 2005101294501 (and English translation).

* cited by examiner

*Primary Examiner*—Kidest Bahta
(74) *Attorney, Agent, or Firm*—Posz Law Group, PLC

(57) ABSTRACT

A power control apparatus acquires a maximum supply amount of power, transient maximum supply amount of power, and transient minimum supply amount of power of each power supply source. The apparatus further acquires a power cost of respective power supply sources, a load-required power and a charge request power. The apparatus acquires a combination of power supply sources that minimizes specific fuel consumption and determines an allocation amount of power. Taking transient response of respective power supply sources into account, the allocation amount of power of each power supply sources is corrected to be greater than a transient minimum supply power and smaller than a transient maximum supply power.

11 Claims, 10 Drawing Sheets

FIG. 10A
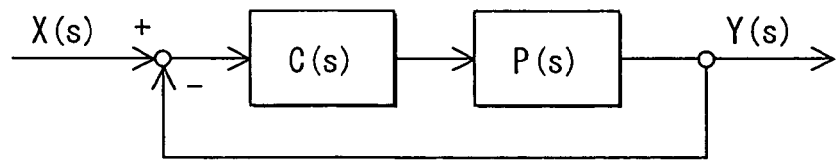
FIG. 10B
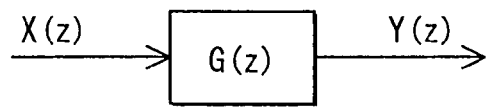
FIG. 10C
$$y_n = ax_n + bx_{n-1} + \cdots + By_{n-1} + Cy_{n-2} + \cdots$$
$$x_n = b'x_{n-1} + c'x_{n-2} + \cdots + A'y_n + B'y_{n-1} + C'y_{n-2} + \cdots$$
FIG. 11A
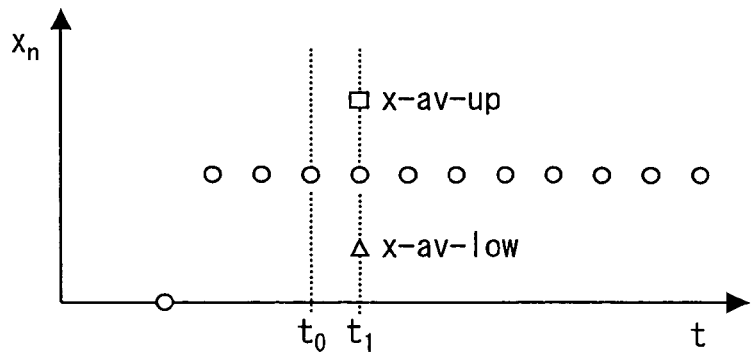
FIG. 11B
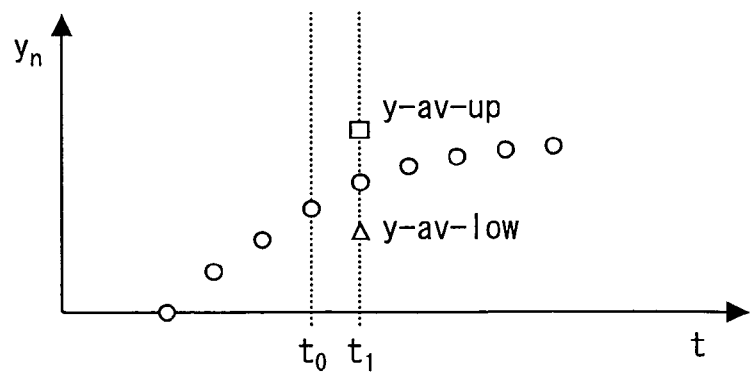

POWER CONTROL APPARATUS AND METHOD FOR ELECTRICAL SYSTEM OF VEHICLE

CROSS REFERENCE TO RELATED APPLICATION

This application relates to and incorporates herein by reference Japanese Patent Application No. 2004-356030 filed on Dec. 8, 2004.

FIELD OF THE INVENTION

The present invention relates to a power control apparatus and method for an electrical system of a vehicle.

BACKGROUND OF THE INVENTION

US 2004/0164616-A1 (JP 2004-260908A) proposes methods for controlling a vehicle electrical system that controls a power cost of a vehicle electrical system, thereby to enhance fuel cost improvement. This control method of an electrical system of a vehicle (vehicle electrical system) is carried out in two steps. In one step, the method obtains or calculates information of power costs each coinciding with a cost per unit amount of electric power of respective one of power energy supply sources, such as the source of engine power generation and regenerative power generation. In accordance with the information thus acquired, in the other step, the method adjusts, for example, power supply proportions of the respective power energy supply sources and receive power proportions or allocations of respective electrical loads or a battery to reduce the respective power energy costs.

In many cases, the power cost varies with variations in a supply amount of power. This variation of the power cost is not taken into account in the above control method. Thus, the average power cost of the entire electrical system may not always be minimized, so that effective fuel consumption improvement cannot be achieved.

Further, according to the above control method, characteristics such as response characteristics of the respective power energy supply sources are not taken into account. For example, a necessary consumption amount of power sharply varies. When the response of a power energy supply source with respect to a power generation command is slow, there will occur excessive power generation or deficient power generation. Consequently, the supply voltage from a power bus to electric loads becomes unstable.

SUMMARY OF THE INVENTION

It is an object to provide a power control apparatus for an electrical system of a vehicle that stabilizes a bus voltage of an electrical system and improves fuel consumption.

According to one aspect, a power control apparatus for an electrical system supplies power from a plurality of power supply sources to an electrical load. The apparatus determines an allocation amount of power for each of the power supply sources so that a power cost of an entirety of the electrical system is minimized, by taking into account a variation in a power cost, which is indicative of a cost per unit amount of power, with respect to a supply amount of each of the power of respective power supply sources. The apparatus controls power generation of each of the power supply sources in accordance with a determined allocation amount of power.

According to another aspect, a power control apparatus for an electrical system has a power supply source including an energy converter that converts energy supplied from an energy source to power and supplies the power to an electrical load. The apparatus calculates information of a maximum supply amount of power indicative of an amount of power suppliable from the power supply source in accordance with information regarding power usable for conversion of energy supplied from the energy source. The apparatus determines a final command value for the power supply source in accordance with a power supply command amount value determined from the maximum supply amount of power.

BRIEF DESCRIPTION OF THE DRAWINGS

The above and other objects, features and advantages of the present invention will become more apparent from the following detailed description made with reference to the accompanying drawings. In the drawings:

FIG. 10A is a block diagram of a sequence model of a power generation command and an actual generation amount of power according to the embodiment;

FIG. 10B is a block diagram of a discretization model according to the embodiment;

FIG. 10C is a mathematical expression representing an input and output relation of the discretization model according to the embodiment;

FIG. 11A is a graph showing an upper limit value and a lower limit value that can be assumed with a maximum supply amount of power at a time step according to the embodiment;

FIG. 11B is a graph showing an upper limit value and a lower limit value that can be assumed with a transient supply amount of power at a time step subsequent to the time step of FIG. 11A;

DETAILED DESCRIPTION OF THE PREFERRED EMBODIMENTS

Figure 1:
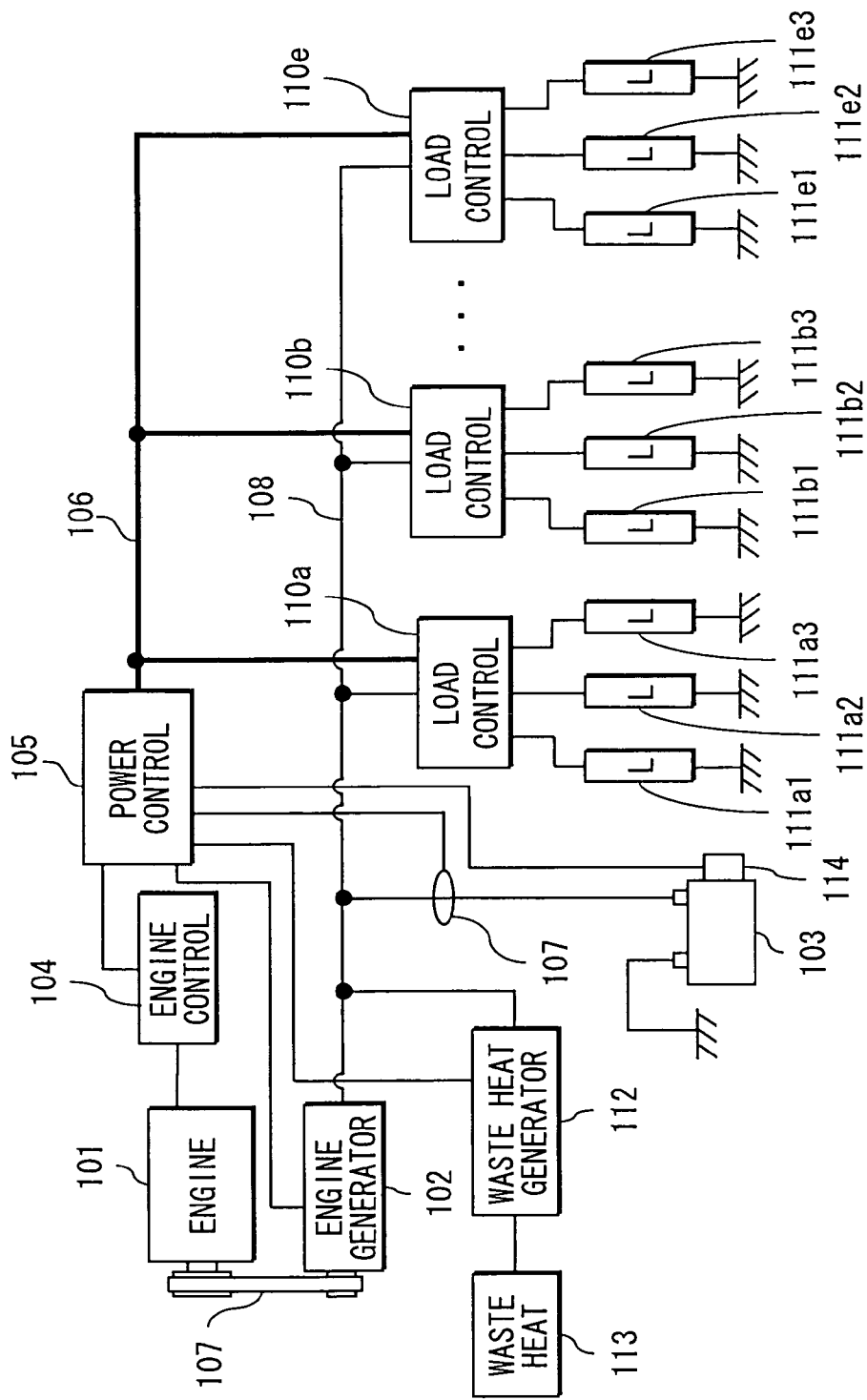
FIG. 1 is a block diagram showing an electrical system of a vehicle and a power control apparatus according to an embodiment of the present invention.

Referring to FIG. 1 showing an electrical system of a vehicle, an engine 101 is connected with an engine generator 102 such as an alternator through a belt 107. The engine generator 102 is connected with a battery 103, which serves as a power storage device, and load control devices 110a to 110e through a power bus 108.

The load control device 110a performs power supply control for corresponding electric loads, that is, loads 111a1 to 111a3. Similarly, the load control device 110b performs power supply control for corresponding loads 111b1 to 111b3, and the load control device 110e performs power supply control for loads 111e1 to 111e3. The load control devices 110a to 110e each contain, for example, an operation switch (not shown) necessary to perform the above power supply control, various sensors (not shown) for the control, thereby to perform output control or connection/disconnection of the corresponding load (i.e., belonging to itself) in accordance with an external input signal, output of the sensor, or the like.

An engine control device 104 is an electronic control device for controlling the engine 101, and is connected to a power control apparatus 105. The engine control device 104 sends to the power control apparatus 105 various types of information, such as engine speeds, detected by sensors (not shown) that detect various states of the engine 101. In addition, the engine control device 104 performs increment and decrement adjustment of the output of the engine 101 in response to a command received from the power control apparatus 105.

A waste heat converter 113 is a device that converts waste heat of, for example, the engine 101 and exhaust gases exhausted from the engine 101 into motive forces. A waste heat generator 112 performs electric power generation from the motive forces converted by the waste heat converter 113, and power generated thereby is output to the power bus 108.

The power control apparatus 105 monitors the states of the engine generator 102, the waste heat generator 112, the battery 103 and the power bus 108. The power control apparatus 105 has an engine power generation control section (not shown) serving as a control apparatus for controlling the engine generator 102, and a waste heat power generation control section (not shown) serving as a control apparatus for controlling the waste heat generator 112. Generation amounts of power of the engine generator 102 and the waste heat generator 112 are controlled in accordance with respective commands received from the power control apparatus 105.

The power control apparatus 105 is connected to the load control devices 110a to 110e through multiplex signal communication lines 106, and bidirectionally communicates information through multicommunication with the load control devices 110a to 110e.

The power control apparatus 105 is connected to a battery current sensor 107, a temperature sensor 114, and a battery voltage sensor (not shown), thereby to receive the input/output current, battery temperature, and battery voltage of the battery 103 and to monitor the state (residual capacity) of the battery 103.

The vehicle electrical system implements stabilization of the bus voltage of the power bus 108. Further, the system implements effective fuel consumption improvement of the engine 101. An operation of a power control process to be executed by the power control apparatus 105 will now be described along flow shown in a flow diagram shown in FIG. 2. In the present embodiment, power supply sources includes the engine generator 102 (power supply source α), the waste heat generator 112 (power supply source β), and the battery 103 (power supply source γ). The following power control process is repeated in units of a predetermined time.

At step (S) 201, calculation is performed to acquire a constantly suppliable amount of power of respective power supply source, a maximum supply amount of power, a transient maximum supply amount of power and a transient minimum supply amount of power. Taking a response time of respective power supply source into account, the transient maximum supply amount of power indicates a maximum supply amount of power suppliable until the subsequent execution (after the passage of a predetermined time). Similarly, the transient minimum supply amount of power indicates a minimum supply amount of power suppliable until the subsequent execution.

The maximum supply amount of power from each power supply source α and β is determined from, for example, the maximum supply amount of power from the engine generator 102 and the efficiency of the engine generator 102, the waste heat generator 112, and absorbable motive forces from the engine 101 and waste heat converter 113 being used as the energy sources. Calculation methods for the maximum supply amount of power from each power supply source α, β, the transient maximum supply amount of power, and the transient minimum supply amount of power will be described in detail further below. The maximum supply amount of power from the power supply source y is determined to be a maximum discharge amount of power sufficient so that the bus voltage of the power bus 108 can be maintained to be greater than or equal to a predetermined voltage.

At S202, a power cost of the supply amount of power from each power supply source is calculated. The power cost is calculated in units of a predetermined amount of power over a range of from a supply amount of power of zero (0) (kW) to the maximum supply amount of power supplied from each power supply source. In this manner, the power cost is provided in the form of a power consumption increment amount (g/kWh) of the engine 101 per unit amount of power.

For example, the power cost for the power supply source α (source of engine power generation) is calculated as follows. It is supposed now that at a present engine speed, b-base (kW) is an engine output with the generated power being zero (0), a1 (g/kWh) is a specific fuel consumption in the engine 101, a2 (g/kWh) is a specific fuel consumption when b (g/kW) is a supply amount of power generated by the engine generator 102, and b2 (kW) is an input power to the generator. In this case, a power cost corresponding to the b (g/kW) is obtained from the following equation (1). However, the power cost when (b=0) is zero (0).

$$\text{Power cost (g/kWh) of power supply source } \alpha = a2 \times (b\text{-base} + b2) - (a1 \times b\text{-base})/b$$

For the power supply source β (source of waste heat power generation), since the waste heat of the engine 101 is used as a motive force source, there occurs no increment for the amount of fuel consumption of the engine 101. Thus, the power cost is all time set to zero (0). For the power supply source γ (battery), a time average value of the power cost of a charge amount of power in a battery charge event, and the average value is used for the power cost. In the present embodiment, it is assumed that the power cost in the power supply source (battery) γ is invariant.

At S203, calculation is performed to obtain a load-required amount of power that indicates a total necessary amount of power required for the electrical load. The necessary amount is calculated in accordance with, for example, the states of switching and other operations. Then at S204, a charge request amount of power of the battery 103 is calculated. The charge request amount of power is determined in accordance with, for example, the residual capacity of the battery 103 that is determined in accordance with, for example, the battery voltage, input/output current, and temperature. The charge request amount of power is set smaller or equal to a maximum input amount of power at which the voltage of the battery 103 does not exceed a predetermined upper limit voltage.

In the event that a total amount of power of the maximum supply amounts of power of the power supply sources α and β (excepting the battery 103) is smaller than the load-required amount of power, the battery 103 is forced to discharge the power. Thus, the charge request amount of power is set to zero (0). A calculation method for the charge request amount will be described in detail further below.

At S205, it is determined whether or not the electrical load request amount of power is greater than a total amount of power of the maximum supply amounts of power from the power supply sources α, β and γ. When the affirmative determination is reached (power failure), then the process moves to S213. Alternatively, when negative determination is reached, the process proceeds to S208.

At S213, a command is issued to respective one of the load control devices 110a to 110e so that the electrical load request amount of power is regulated to be smaller than or equal to the total amount of power. This reduces the power consumption of the electrical loads. At S214, an allocation amount of power, that is, power to be allocated to each power supply source, is set to the maximum supply amount of power from each power supply source.

At S208, it is determined whether or not the charge request amount of the battery 103 is greater than or equal to zero (0). Since the battery 103 cannot be discharged and charged at the same time, when the charge request amount of power is greater than or equal to zero (0), then the maximum supply amount of power from the power supply source γ (battery) is set to zero (0).

At S210, allocation amounts of power of respective power supply sources are determined. A determination method for the allocation amounts of power will be described hereinbelow with reference to FIG. 3. The allocation amounts of power of respective power supply sources are determined to satisfy the following conditions. The conditions require that a total value of the supply amounts of power from each power supply sources is the same as a total amount of power of the electrical load request amounts of power and the charge request amount of power (charge request amount of power=0, in the diagram). The conditions further require that the supply amount of power of respective power supply source does not exceed the maximum supply amount of power of respective power supply source. The allocation amount of power is determined by combining power supply sources to thereby minimize the specific fuel consumption, which represents the power cost associated with the power supply, to satisfy the conditions described above.

Figure 3:
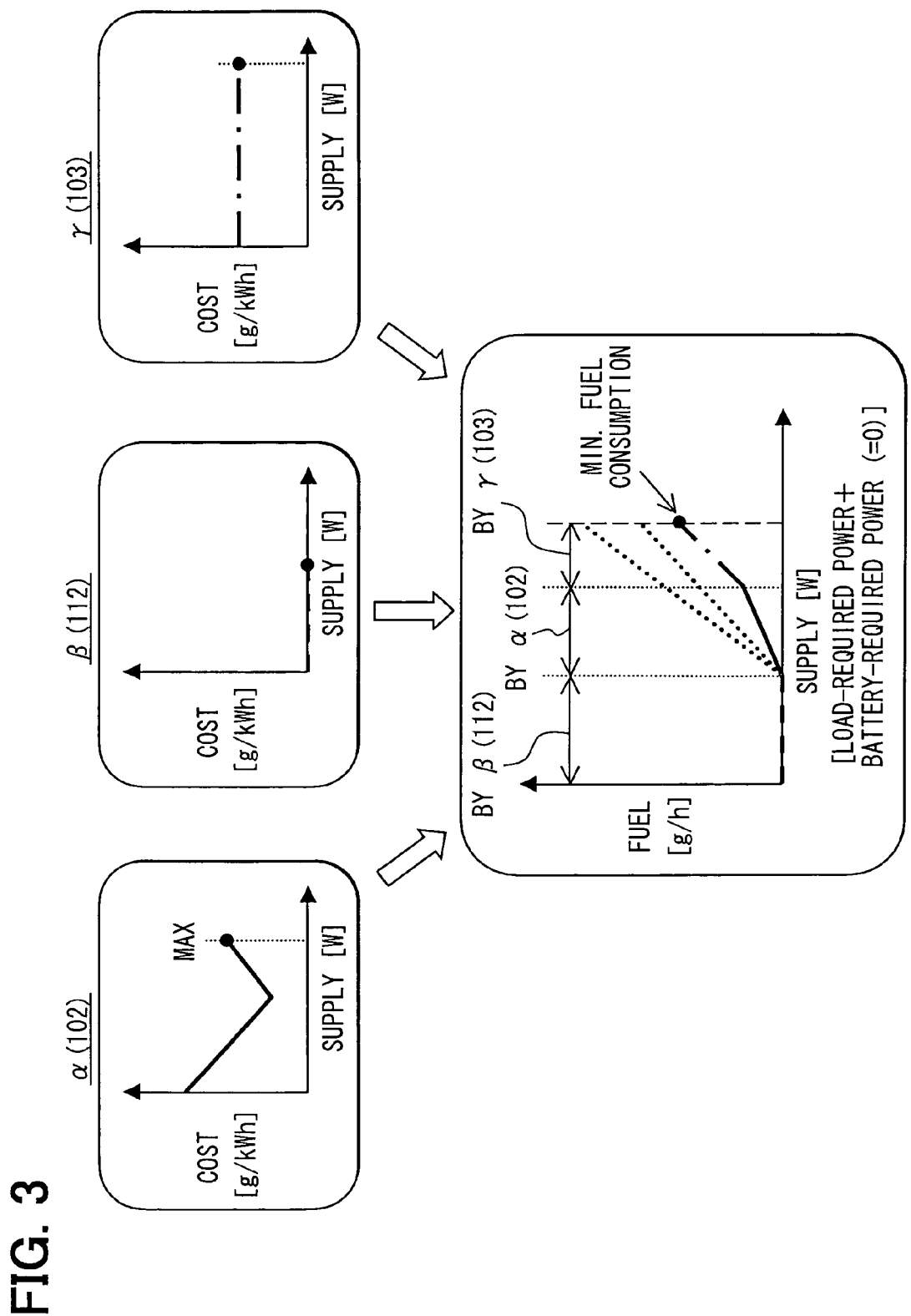
FIG. 3 is a schematic diagram of a determination method for allocated amounts of power according to the embodiment.

As shown in FIG. 3, for the power cost in the power supply source α (source of engine power generation), the power cost per unit amount of power with respect to the supply amount of power has variations. Thus, the allocation amounts of power of respective power supply sources are determined taking the variations into account. Accordingly, the supply amounts of respective power supply sources can be adjusted to be balanced so that the power cost necessary in the entirety of the electrical system is minimized. Consequently, fuel consumption improvement can be effectively accomplished.

In the embodiment, only the power supply source α (source of engine power generation) has variations in the power cost per unit amount of power with respect to the supply amount of power. However, even in a configuration including a plurality of such power supply sources, allocation amounts of power are determined in a similar method.

Figure 5A:
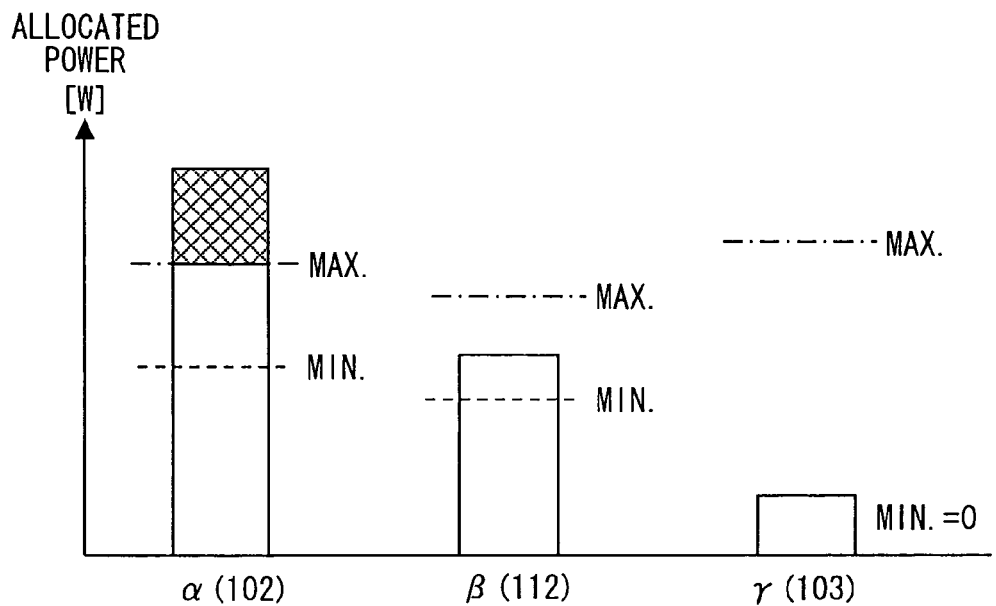
FIGS. 5A and 5B, respectively, are graphs of a correction method for allocated amounts of power in the event that an allocated amount of power of a power supply source exceeds a transient maximum supply amount of power according to the embodiment.

FIG. 5A shows a case where the allocation amount of power of the power supply source α (engine generator 102) is greater than the transient maximum supply amount of power. In such a case, the required amount of power cannot be supplied due to insufficient power generation (hatched) until the subsequent supply, consequently causing temporal power failure which leads to a fall of the bus voltage of the power bus 108.

Therefore, at S211, a transient response of respective power supply source is taken into account, correction is performed so that the allocation amount of power of respective power supply source is greater than or equal to the transient minimum supply amount of power and smaller than or equal to the transient maximum supply amount of power.

Figure 5B:
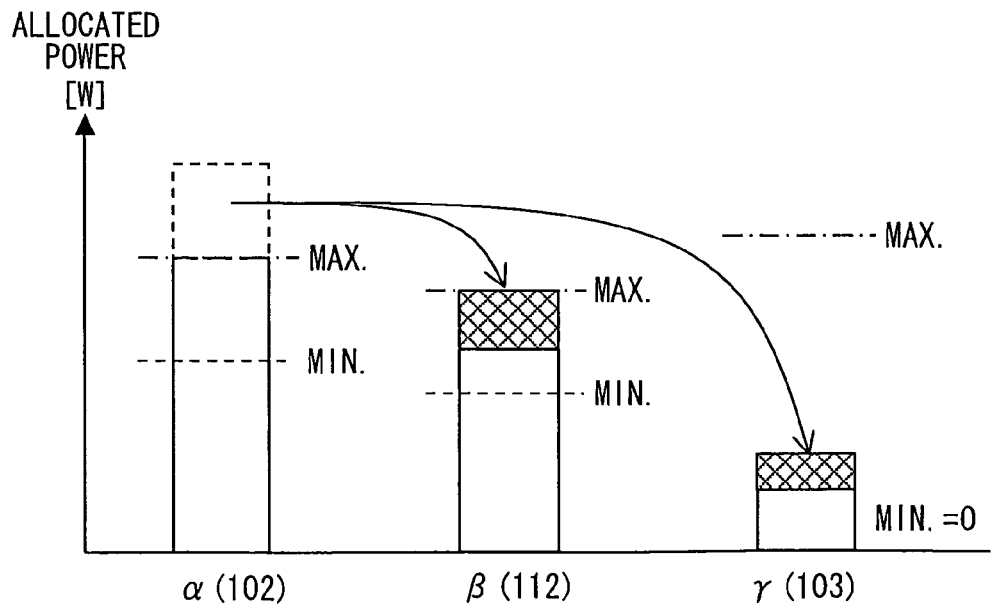

In this step, as shown in FIG. 5B, the allocation amount of power of the power supply source α is limited to the transient maximum supply. In addition, a non-suppliable amount of power greater than or equal to the transient maximum supply amount of power is temporally allocated to the power supply sources β and γ. This corrects the allocation amounts of power of respective power supply sources to enable the necessary amount of power to be supplied. In this case, however, a limit is applied so that the allocation amount of power of respective of the power supply sources β and γ is greater than or equal to the transient minimum supply amount of power and smaller than or equal to the transient maximum supply amount of power. When sufficient correction cannot be made even within the limit being applied, the load amounts of power may be reduced by using the load control devices 110a to 110e.

Figure 6A:
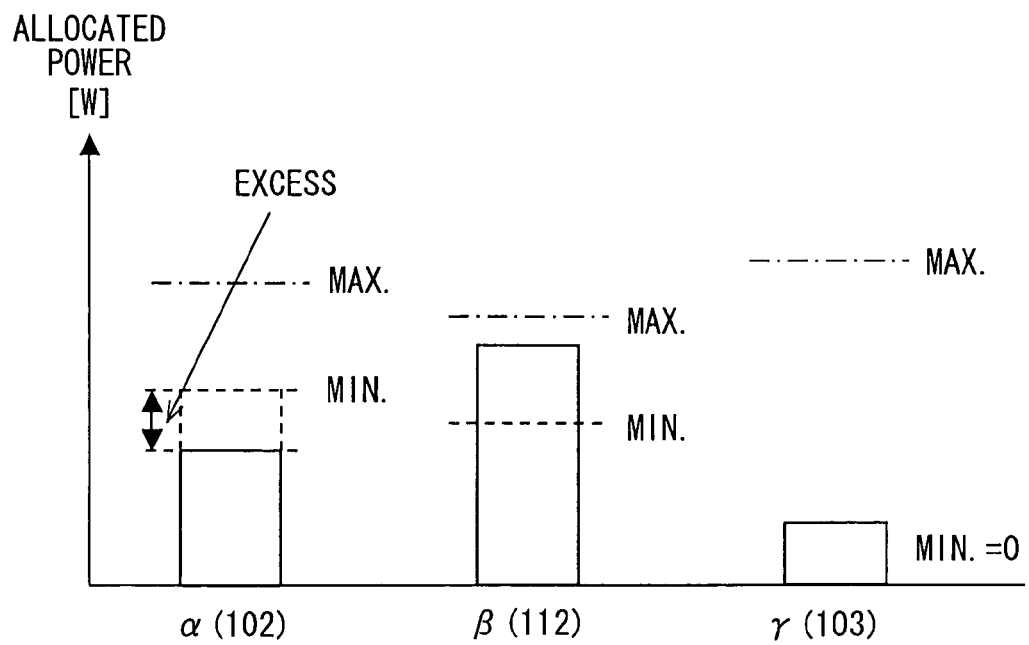
FIGS. 6A and 6B, respectively, are graphs of a correction method for allocated amounts of power in the event that an allocated amount of power of the power supply source exceeds a transient minimum supply amount of power according to the embodiment.

In contrast, FIG. 6A shows a case where the allocation amount of power of the power supply source α is smaller than the transient minimum supply amount of power. In this case, since this excess power cannot be reduced until the subsequent execution. Therefore, if transient power correction at S211 is not attained, temporal over-power (excess power) supply will take place, consequently causing a rise of the bus voltage of the power bus 108.

Figure 6B:
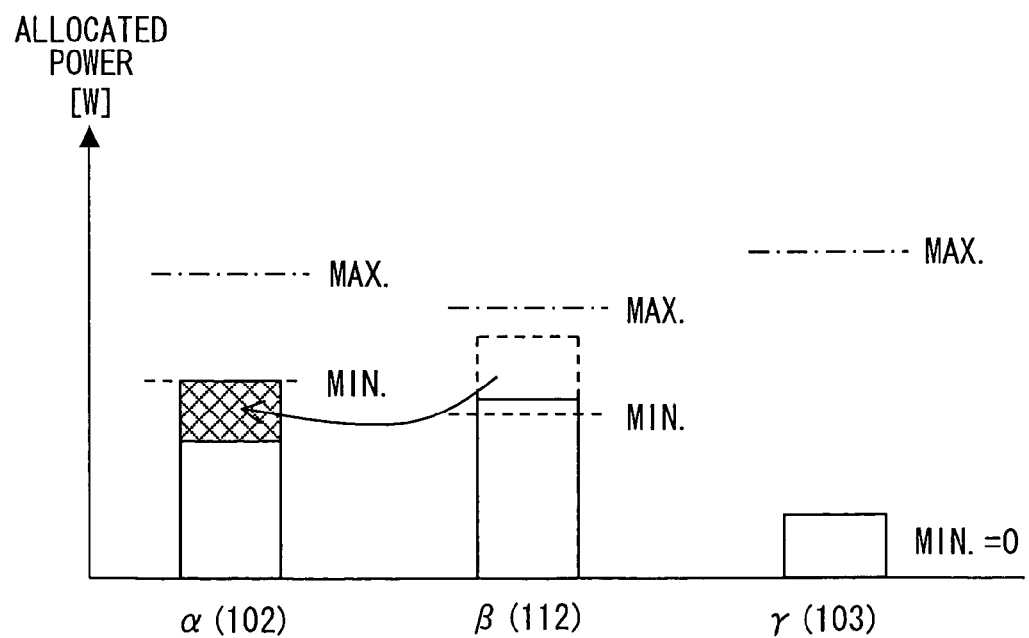

In this case, as is shown in FIG. 6B, the allocation amount of power of the power supply source α is reset to the transient minimum supply amount of power, and the allocation amount of power is corrected so that the allocation amount of power of the power supply source β is reduced. In this case, however, a limit is applied so that the allocation amount of power of respective of the power supply sources β and γ is greater than or equal to the transient minimum supply amount of power and smaller than or equal to the transient maximum supply amount of power.

When sufficient correction cannot be made even within the limit being applied, the following operation is performed. When an excessive amount of power, which remains uncorrected, is used to charge the battery 103, it is determined whether or not the bus voltage of the power bus 108 becomes a specified value or greater. When the voltage does not become the specified value or greater, then the battery 103 is charged with the excessive amount of power. Alternatively, when the voltage becomes the specified value or greater, then the load amounts of power may be increased by the load control devices 110a to 110e.

A case other than the practical examples shown in FIGS. 5A, 5B, 6A, and 6B is now considered. In this case, when the allocation amounts of power of respective power supply sources do not become greater than or equal to the transient minimum supply amount of power and smaller than or equal to the transient maximum supply amount of power, then a method similar to the above is used to perform interactive corrections. This enables restraining temporal voltage variations that occur in the bus voltage with the response delay in each power supply source of the electrical system.

At S212, the corrected allocation amounts of power of respective power supply sources are instructed to each power supply sources. Then, the above sequence of S201 to S212 is executed again.

(Calculation Method for Charge Request Amount of Power)

The calculation method for the charge request amount of power in S204 will be described in detail hereinbelow with reference to FIG. 4. Charging and discharging of the battery 103 causes power to accumulate in the battery 103 when the power cost is low, and causes the battery 103 to discharge the power when the power cost is high, hence leading to fuel economy improvement.

Figure 4:
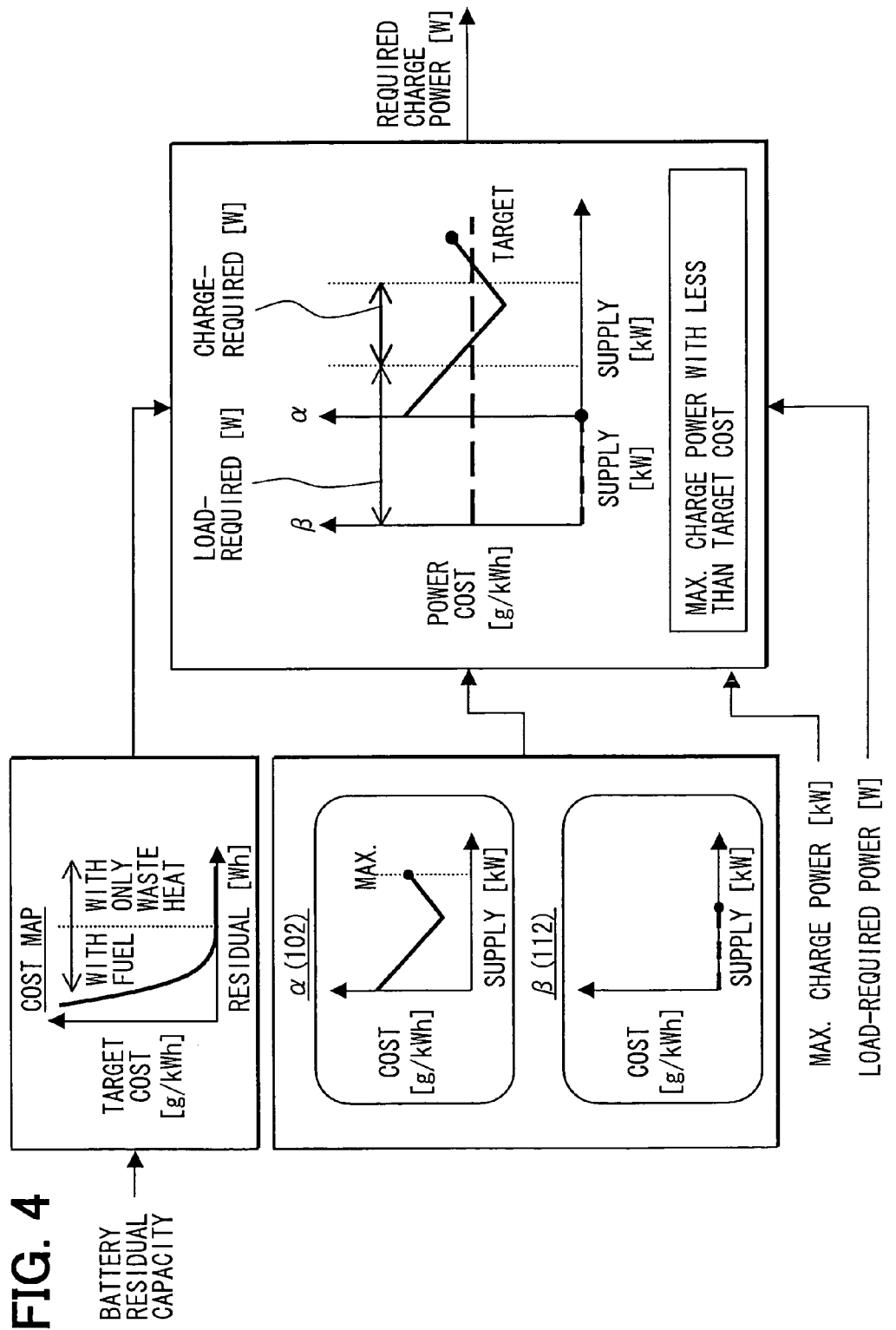
FIG. 4 is a schematic diagram of a calculation method for a charge request amount of power of a battery according to the embodiment.

As shown in FIG. 4, input values for the calculation of the charge request amount of power (required charge power) are:
target cost set in accordance with the battery residual capacity;
power costs of the power supply sources $\alpha$ and $\beta$, excepting the power supply source $\gamma$ (it is excepted because the battery 103 cannot be charged and discharged at the same time);
maximum charge amount of power of the battery 103 (=maximum input amount of power at which the voltage of the battery 103 does not exceed the upper limit voltage); and
load-required amount of power.

In accordance with the input values, a charge request amount of power is set to a value obtained by the subtraction of the load-required amount of power from the maximum supply amounts of power of the power supply sources $\alpha$ and $\beta$ that can be output at a cost lower than or equal to the target cost. However, the charge request amount of power is set greater than or equal to zero (0) and smaller than or equal to the maximum charge amount of power. With this, the charge request amount of power can be controlled to the target cost that is set in accordance with the residual capacity of the battery 103.

The target cost indicates a target value of power cost in the event of charging the battery 103. As shown in a cost map in FIG. 4, the target cost is set smaller as a residual amount of battery power is larger and is set larger as the residual amount is smaller in accordance with the battery residual capacity.

For example, control is performed such that when the residual amount of battery power is sufficient and hence the target cost is zero (0), the battery 103 is not charged with power other than such power supplied by the waste heat recovery power generation, whose power cost is zero (0). In addition, control is performed such that, to prevent power failure when the battery 103 is used to supply the electrical load power during parking of the vehicle, the target cost is gradually increased to effect charging although a power cost occurs.

Thus, in the case the residual amount of battery power is sufficient, when the target cost is set low and a low power cost can be realized, the charge request amount of power becomes greater than zero (0), so that at S210 (FIG. 2) power of a power cost satisfying the target cost is used for charging. On the other hand, when the low power cost cannot be realized, the charge request amount of power becomes zero (0), so that the battery 103 is handled as a power supply source. Consequently, the electric energy accumulated in the battery 103 can be supplied.

In contrast, as the residual amount of battery power decreases, the target cost gradually becomes higher. In this case, while charging is performed involving occurrence of a power cost, control is performed so that charging can be effected with a maximum possible amount of power at a cost lower than or equal to the target cost. Consequently, the reduced residual amount of battery power can be recovered at a stage where the target cost is relatively low. Therefore, while preventing the risk of battery shutdown, preferred fuel consumption effects can be secured.

(Calculation Method for Maximum Supply Amounts of Power and Transient Maximum/Minimum Supply Amounts of Power of Power Supply Sources $\alpha$ and $\beta$)

The maximum supply amounts of power, transient maximum supply amounts of power, and transient minimum supply amounts of power of respective power supply sources $\alpha$ and $\beta$ are calculated in accordance with information regarding usable amounts of power for converting to power from energy sources of respective power supply sources $\alpha$ and $\beta$ (engine torque in the case of the power supply source $\beta$, and calorie in the case of the power supply source $\alpha$).

Figure 2:
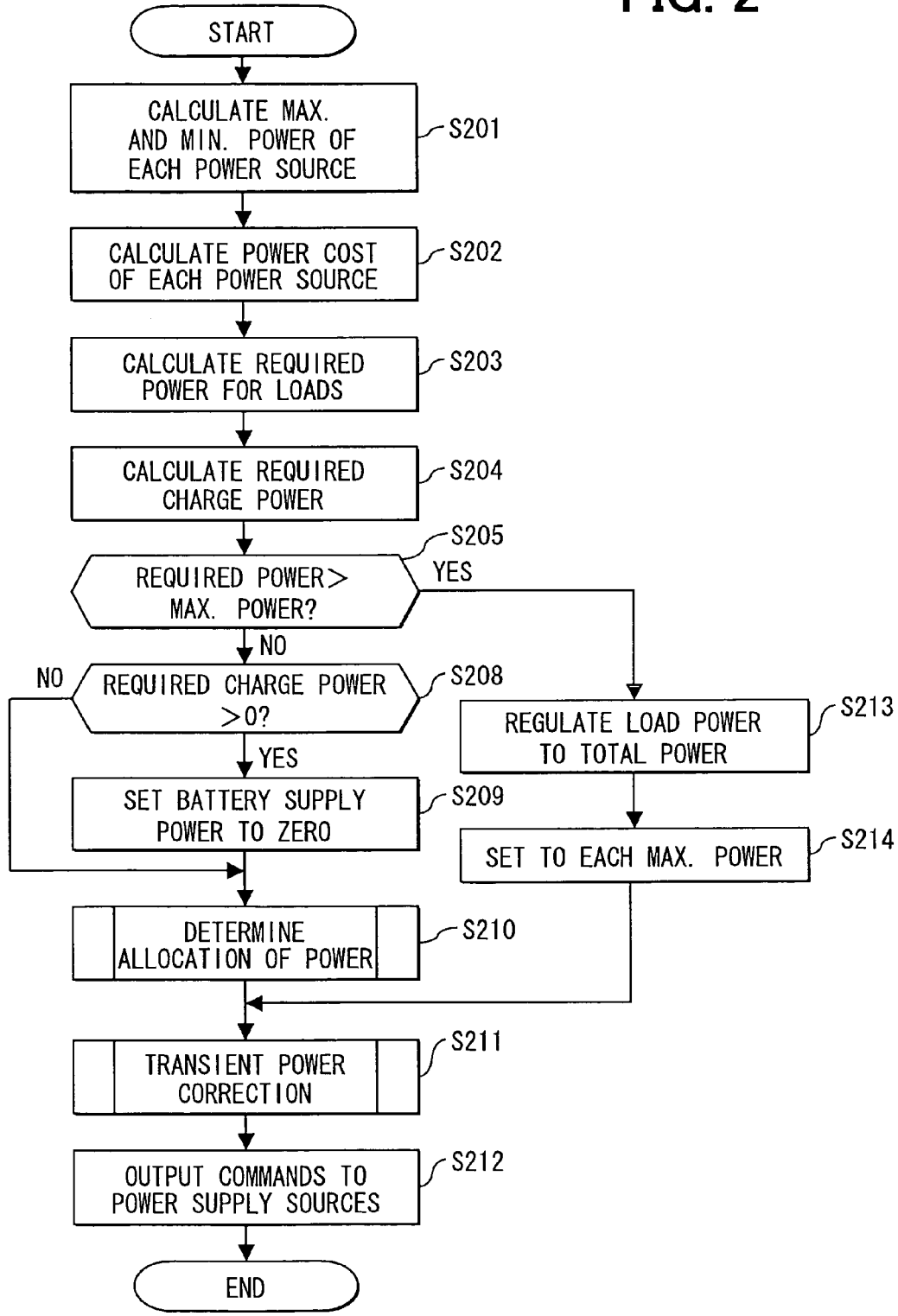
FIG. 2 is a flow diagram of a power control process executed by the power control apparatus according to the embodiment.
Figure 8:
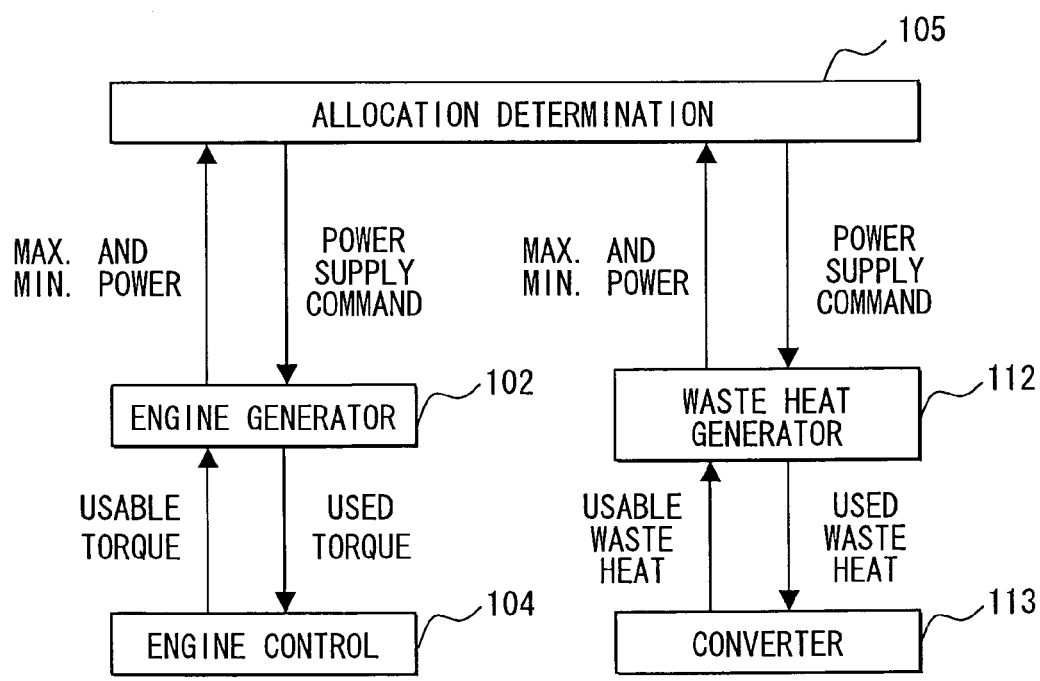
FIG. 8 is a schematic diagram of the relationship between an energy source and an engine generator and the relationship between the energy source and a waste heat generator according to the embodiment.

As shown in FIG. 8, energy converters, such as the engine generator 102 and the waste heat generator 112 acquire information (engine torque and calorie) regarding usable amounts of power generated from energy sources, which serve as sources of the energy, from the engine control device 104 and the waste heat converter 113. In accordance with the information regarding the power, the respective maximum supply amount of power, transient maximum supply amount of power, and transient minimum supply amount of power are calculated. Data obtained through the calculation are then sent to an allocation determination section of the power control apparatus 105. In the allocation determination section, S202 to S212 of the power control process shown in FIG. 2 are executed, allocation amounts of power for the respective energy converters are determined, and power supply command amount values indicative of the allocation amounts of power are sent to the respective energy converters.

Thus, the respective maximum supply amount of power, transient maximum supply amount of power, and transient minimum supply amount of power are calculated in accordance with the information regarding the usable amounts of power generated from the energy sources for performing the energy conversion (power generation). Thus, for example, when the engine torque is not desired to use for engine power generation during rapid acceleration of the vehicle, the usable amounts of power for the energy conversion are reduced. This consequently makes it possible to restrain consumption of the engine torque.

In comparison, according to the control method of the vehicle electrical system shown in FIGS. 5A and 6A, the suppliable amount of power by the engine power generation is set as the maximum suppliable amount of power at the present rotation speed of the engine. Accordingly, upon request for an amount of power, the maximum suppliable amount of power is generated. Thus, even when it is desired to restrain the consumption of the torque of the engine, the desire is not addressable. However, in the present embodiment, the respective maximum supply amount of power, transient maximum supply amount of power and transient minimum supply amount of power are calculated in accordance with the information regarding the usable amounts of power generated from the energy sources for performing the energy conversion (power generation).

Figure 9:
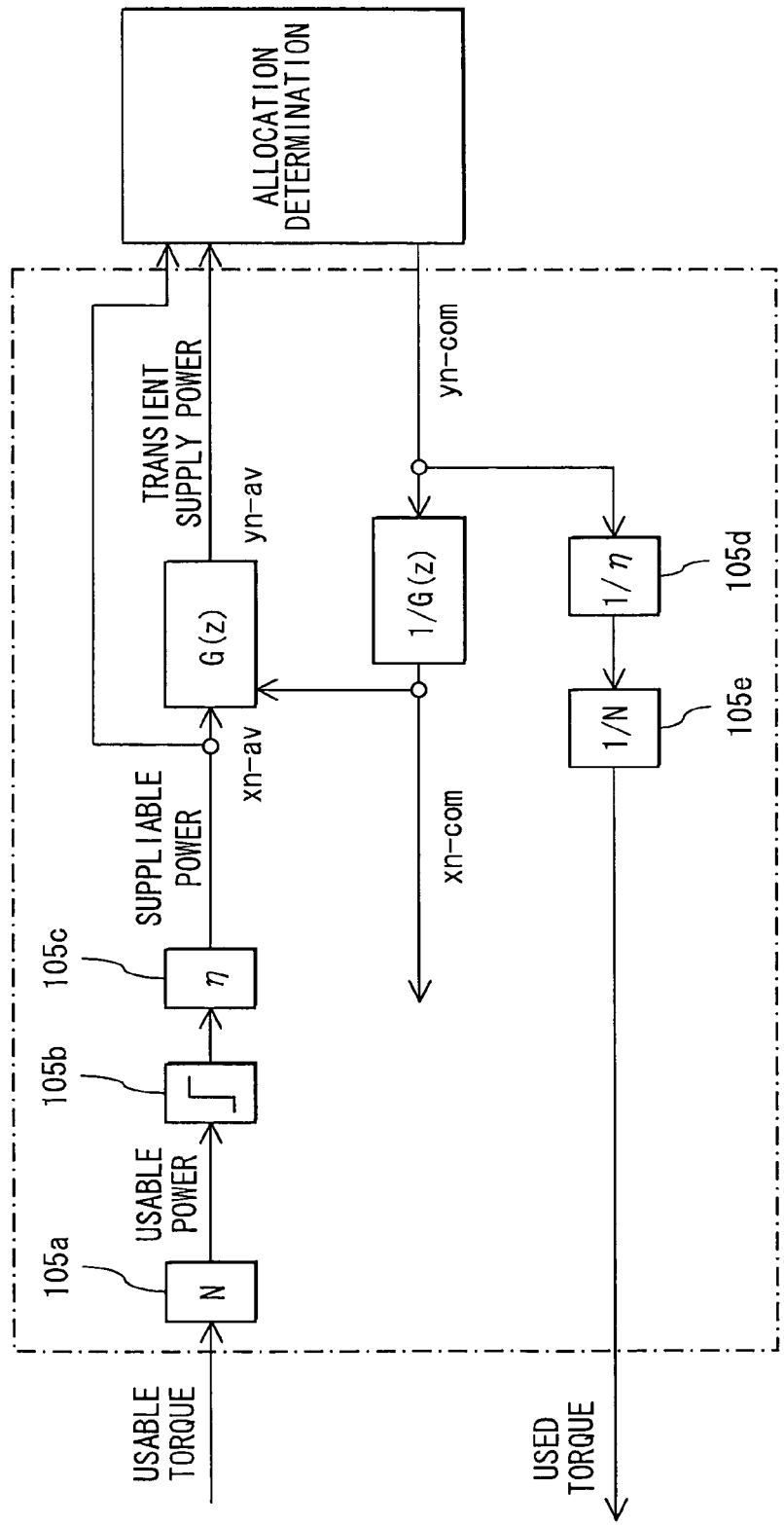
FIG. 9 is a block diagram of a control system of a control section in an engine-driven generator according to the embodiment.

FIG. 9 shows an internal configuration of the control apparatus 105, specifically a control section for the engine generator 102. Regarding a control section for the waste heat generator 112, the basic configuration is similar.

When information of engine torque usable for the energy conversion (power generation) is input, at 105a the engine torque is multiplied by a rotation speed (N) of the engine generator 102, thereby to calculate information of the usable power.

At 105b, a limit is applied using a maximum conversion amount of power (when dependent on the rotation speed, the speed also is taken into account). This determines an energy convertible (generatable or suppliable) amount of power. Then at 105c, the multiplication of the amount of power times an efficiency ($\eta$) of the engine generator 102 is performed, thereby to calculate a generatable (suppliable) amount of power (xn-av). Thus, performance characteristics, such as the efficiencies of, for example, the energy converters, i.e., the engine generator 102 and the waste heat generator 112, are taken into account. With this, precise suppliable amounts of power can be calculated and acquired.

As described above, in the configuration of FIG. 9, the usable torque (engine torque) is input. However, when upper and lower limit values (maximum and minimum values) of the usable torque are input, a maximum (constant) supply amount of power and a minimum (constant) supply amount of power of the suppliable amount of power (xn-av) can be acquired.

The suppliable amount of power (xn-av) is input into a discretization model G(z) of the system, which is configured of the energy converter (engine generator for the engine power generation) and the control device for controlling the energy converter (control section for the engine generator for engine power generation). A transient supply amount of power (yn-av) generatable (suppliable) at the subsequent execution after a predetermined time is thereby calculated. When the maximum supply amount of power and the minimum supply amount of power are input into the discretization model G(z), the transient maximum supply amount of power and the transient minimum supply amount of power are calculated, respectively.

Thus, with the suppliable amount of power (xn-av) input into the discretization model G(z), the supply amount of power can be calculated taking into account delays (such as response delays) of, for example, the energy converter and the control device that controls the energy converter.

The discretization model G(z) will be described hereinbelow with reference to FIGS. 10A to 10C. FIG. 10A is a sequence model of a control system formed of a controller C(s) and a plant P(s), the controller C(s) corresponding to the control section for, for example, the engine generator 102 or waste heat generator 112 and plant P(s) corresponding to the energy converter (such as the engine generator or waste heat generator). In the control system, the control apparatus C(s) controls the plant P(s) such that an actual generation (supply) amount of power Y(s) follows a generation (supply) command X(s). The control system is represented with a single communication function and, further, is discretized, thereby forming a discretization model G(z) shown in FIG. 10B.

With this arrangement, a power supply command amount (yn-com) indicative of an amount of power suppliable at the subsequent execution after the predetermined time can be updated by taking the transient generation amount of power (yn-av) into account while looking up the suppliable amount of power (xn-av). Accordingly, the power supply command amount (yn-com) can be appropriately updated to be a final target supply amount of power that is actually suppliable at the subsequent execution.

The power supply command amount (yn-com) is input into a reverse model 1/G(s) with respect to a discretization model G(z) 105d, thereby to calculate a power supply command input value (xn-com) that is to be input into the energy converter at the subsequent execution. Accordingly, a final command value can be calculated. The command (input) value (xn-com) is input into the discretization model G(z).

The power supply command amount (yn-com) is determined by the allocation determination section as follows. For example, with reference to FIGS. 11A and 11B, at a time (step) ($t_0$), respective upper and lower limit values (xn-av-up) and (xn-av-low) assumable by the suppliable amount of power (xn-av) at a subsequent execution ($t_1$) are input. This enables calculation of respective upper and lower limit values (yn-av-up) and (yn-av-low) of amounts of power generatable at the subsequent execution. Thus, the power supply command amount (yn-com) is determined to be within the range of the upper limit values.

More particularly, with reference to FIG. 10C, (yn) is determined by previous (yn) and (xn) and (xn) being input at the subsequent execution. Accordingly, with (xn-av-up) being substituted for (xn), (yn-av-up) is determined; and with (xn-av-low) being substituted therefor, (yn-av-low) is determined. In contrast, (xn) is determined by previous (yn) and (xn) and (yn) desired at the subsequent execution is determined. Accordingly, with (yn-com) being substituted for (yn), a value (xn-com) to be instructed at the subsequent execution to the control section of the energy converter can be calculated and acquired.

Thus, the generatable amount of power including a power generation (supply) delay represented by a time constant of the energy converter can be predicted. Accordingly, even when an actual power generation command is received, follow-up processing can be performed, thereby enabling preventing the fall of a bus voltage of the power bus 108.

(First Modification)

Figure 7:
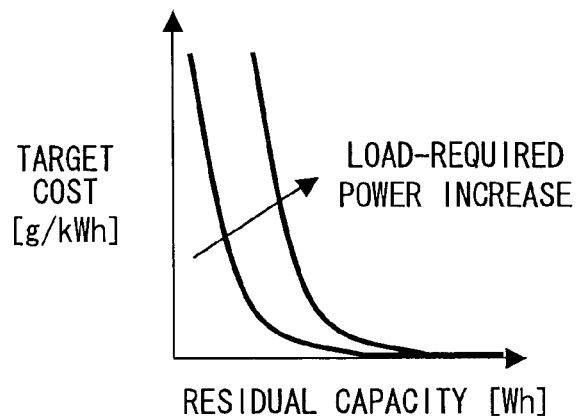
FIG. 7 is a graph of another calculation method for the charge request amount of power of the battery according to the embodiment.

According to the present embodiment, as shown in FIG. 4, the target cost is set in accordance with the battery residual capacity. However, as shown in FIG. 7, the target cost may be set higher as the load-required amount of power increases. Accordingly, the target cost can be set high when the load-required amount of power is large, whereby the reduction in the battery power can be minimized, and hence battery shutdown can be prevented.

(Second Modification)

Figure 12A:
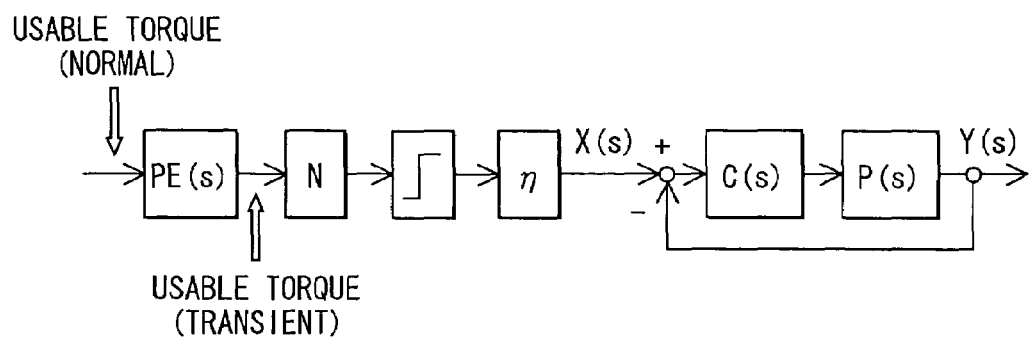
FIG. 12A is a block diagram showing a configuration wherein an element simulating a response performance of an engine is added to the configuration of the control section of the engine generator according to the embodiment.

As shown in FIG. 12A, a response delay element PE(s) of the engine output torque can be incorporated in the control system shown in FIG. 9. In this case, torque information of torque actually outputtable with the delay can be used, thereby enabling control to be performed in accordance with a value of the information. Consequently, engine torque insufficiency can be prevented from occurring in the event of power generation (supply), and hence desired drivability of the vehicle can be secured.

Figure 12B:
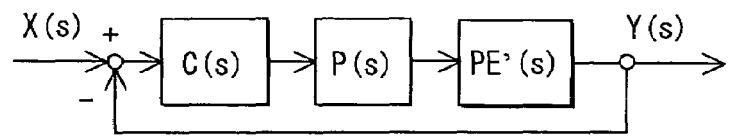
FIG. 12B is a block diagram showing a configuration wherein a response delay of the engine is added as a delay element at a portion after a plant according to the embodiment.

In addition, as shown in FIG. 12B, with the response delay element PE(s)' provided subsequent to the plant P(s), the configuration can be simplified. In this case, in the discretization model G(z) shown in FIG. 9, P(s) and PE(s)' can be handled as a single element.

What is claimed is:

1. A power control apparatus for an electrical system for supplying power from a plurality of power supply sources to an electrical load, the apparatus comprising:
   allocation determination means that makes a determination of an allocation amount of power for each of the power supply sources so that a power cost of an entirety of the electrical system is minimized, by taking into account a variation in a power cost, which is indicative of a cost per unit amount of power with respect to a supply amount of each of the power of respective power supply sources;
   control means that controls power generation of each of the power supply sources in accordance with a determined allocation amount of power;
   demand power acquiring means that acquires a demand amount of power indicative of an amount of power necessary to be supplied overall from the plurality of power supply sources to the electrical system;
   power information calculation means that performs calculation of information of a maximum supply amount of power indicative of a power suppliable from each power supply source and of the power cost, which is the cost per unit amount of power, for the supply amount of power of respective power supply source,
   wherein the allocation determination means makes a determination of the allocation amount of power for each power supply source with which the power cost of the entirety of the electrical system is minimized, the determination being made to satisfy a condition that a total amount of power of the supply amounts of power of respective power supply sources is equal to the demand amount of power and the supply amount of power of respective power supply source is within a maximum supply amount of power of respective power supply source;
   necessary power acquiring means that acquires a load-required amount of power indicative of a necessary amount of power of the electrical load; and
   charge request power acquiring means that acquires a charge request amount of power of power storage means of the power supply sources,
   wherein the demand power acquiring means acquires a sum of the load-required amount of power and the charge request amount of power to be the demand amount of power.

2. A power control apparatus for an electrical system according to claim 1, wherein:
   the charge request power acquiring means includes target cost setting means that sets a target cost being used in the event of charging the power storage means in accordance with a residual capacity of the power storage means,
   the charge request amount of power is set to an amount of power obtained by a subtraction of the load-required amount of power from a maximum amount of power of respective power supply sources that is output a cost lower than or equal to the target cost in accordance with the target cost, the power cost of respective power supply source other than the power storage means, a maximum charge amount of power of the power storage means, and the load-required amount of power.

3. A power control apparatus for an electrical system according to claim 2, wherein the target cost setting means sets the target cost to be higher as the residual capacity of the power storage means is smaller, and sets the target cost to be lower as the residual capacity of the power storage means is greater.

4. A power control apparatus for an electrical system according to claim 2, wherein the target cost setting means sets the target cost to be higher as the load-required amount of power is greater.

5. A power control apparatus for an electrical system for supplying power from a plurality of power supply sources to an electrical load, the apparatus comprising:
   allocation determination means that makes a determination of an allocation amount of power for each of the power supply sources so tat a power cost of an entirety of the electrical system is minimized, by taking into account a variation in a power cost, which is indicative of a cost per unit amount of power, with respect to a supply amount of each of the power of respective power supply sources;
   control means that controls power generation of each of the power supply sources in accordance with a determined allocation amount of power;
   demand power acquiring means that acquires a demand amount of power indicative of an amount of power necessary to be supplied overall from the plurality of power supply sources to the electrical system; and
   power information calculation means that performs calculation of information of a maximum supply amount of power indicative of a power suppliable from each power supply source and of the power cost, which is the cost per unit amount of power, for the supply amount of power of respective power supply source;
   wherein the allocation determination means makes a determination of the allocation amount of power for each power supply source with which the power cost of the entire of the electrical system is minimized, the determination being made to satisfy a condition that a total amount of power of the supply amounts of power of respective power supply sources is equal to the demand amount of power and the supply amount of power of respective power supply source is within a maximum supply amount of power of respective power supply source;
   wherein at least one of the plurality of power supply sources includes an energy converter that converts power supplied from an energy source to power; and
   the power information calculation means performs calculation of a maximum supply amount of power of the power supply source including the energy converter in accordance with information regarding usable power for conversion of power from the energy source of the power supply source.

6. A power control apparatus for an electrical system according to claim 5, wherein, taking performance of the energy converter into account, the power information calculation means performs calculation of the maximum supply amount of power of the power supply source including the energy converter.

7. A power control apparatus for an electrical system for supplying power from a plurality of power supply sources to an electrical load, the apparatus comprising:
   allocation determination means that makes a determination of an allocation amount of power for each of the power supply sources so that a power cost of an entirety of the electrical system is minimized by taking into account a vanation in a power cost, which is indicative of a cost per unit amount of power, with respect to a supply amount of each of the power of respective power supply sources;
   control means that controls power generation of each of the power supply sources in accordance with a determined allocation amount of power demand power acquiring means that acquires a demand amount of power indicative of an amount of power necessary to be supplied overall from the plurality of power supply sources to the electrical system; and power information calculation means that performs calculation of information of a maximum supply amount of power indicative of a power suppliable from each power supply source and of the power cost, which is the cost per unit amount of power, for the supply amount of power of respective power supply source, wherein the allocation determination means makes a determination of the allocation amount of power for each power supply source with which the power cost of the entirety of the electrical system is minimized, the determination being made to satisfy a condition that a total amount of power of the supply amounts of power of respective power supply sources is equal to the demand amount of power and the supply amount of power of respective power supply source is within a maximum supply amount of power of respective power supply source;

wherein the power information calculation means performs calculation of a maximum supply amount of power constantly suppliable from each power supply source, and performs calculation of a transient supply amount of power suppliable from the power supply source after a predetermined time; and the allocation determination means makes the determination of the allocation amount of power for the power supply source in accordance with the maximum supply amount of power and the transient supply amount of power.

8. A power control apparatus for an electrical system according to claim 7, wherein:

the power information calculation means performs calculation of a maximum supply amount and a transient minimum supply amount of power, respectively, indicative of an upper limit value and a lower limit value of the transient supply amount of power; and the allocation determination means includes correction means for performing correction so that the allocation amount of power of the power supply source becomes greater than or equal to the transient minimum supply amount of power in the power supply source and smaller than or equal to the transient maximum supply amount of power.

9. A power control apparatus for an electrical system according to claim 5, wherein the power information calculation means includes maximum supply power calculation means that inputs information regarding the power into a system model of a system configured to include the energy convener and a control device which controls the energy converter, and that performs calculation of the maximum supply amount of power of the power supply source including the energy converter.

10. A power control apparatus for an electrical system according to claim 9, wherein the control means includes final command value calculation means that inputs a power supply command value indicative of the allocation amount of power determined by the allocation determination means into a reverse model with respect to the system model, and that performs calculation of a final command value for the energy converter.

11. A power control apparatus for an electrical system according to claim 10, wherein the maximum supply power calculation means and the final command value calculation means each performs the calculation by using a system model into which a response delay element of the energy source is incorporated and the reverse model.

\* \* \* \* \*